US008192621B2

(12) United States Patent
Ferraresi

(10) Patent No.: US 8,192,621 B2
(45) Date of Patent: Jun. 5, 2012

(54) APPARATUS FOR FILTERING FLUIDS

(76) Inventor: Vittorio Ferraresi, Como (IT)

(*) Notice: Subject to any disclaimer, the term of this patent is extended or adjusted under 35 U.S.C. 154(b) by 294 days.

(21) Appl. No.: 12/465,779

(22) Filed: May 14, 2009

(65) Prior Publication Data

US 2009/0283461 A1    Nov. 19, 2009

(30) Foreign Application Priority Data

May 14, 2008 (IT) .............................. MI08A000868

(51) Int. Cl.
*B01D 35/30* (2006.01)

(52) U.S. Cl. ........ 210/232; 210/248; 210/450; 210/452; 210/453; 210/455

(58) Field of Classification Search .................. 210/232, 210/248, 443, 448, 450, 452, 453, 454, 455, 210/459
See application file for complete search history.

(56) References Cited

U.S. PATENT DOCUMENTS

| | | | | |
|---|---|---|---|---|
| 1,630,223 A | * | 5/1927 | Stiehm | 210/443 |
| 2,625,273 A | * | 1/1953 | Schuller | 210/452 |
| 4,738,786 A | * | 4/1988 | Wykoff | 210/248 |
| 4,818,398 A | * | 4/1989 | Lott et al. | 210/452 |
| 5,132,013 A | * | 7/1992 | Thompson | 210/448 |
| 5,137,632 A | * | 8/1992 | Morgan, Jr. | 210/450 |
| 5,389,253 A | * | 2/1995 | Cicconi | 210/248 |
| 5,560,820 A | | 10/1996 | Consolo | |
| 7,011,754 B2 | * | 3/2006 | Chang | 210/450 |
| 2006/0091062 A1 | * | 5/2006 | Akahori et al. | 210/448 |
| 2009/0283461 A1 | | 11/2009 | Ferraresi | |

FOREIGN PATENT DOCUMENTS

| | | |
|---|---|---|
| DE | 19740179 A1 | 4/1999 |
| EP | 2127717 A1 | 12/2009 |
| FR | 2633193 A1 | 12/1989 |

* cited by examiner

*Primary Examiner* — Christopher Upton
(74) *Attorney, Agent, or Firm* — Browdy and Neimark, PLLC

(57) ABSTRACT

There is provided an apparatus (1) for filtering fluids comprising channelling means (2), a main body (3) connected to the channelling means (2) and defining internally a housing cavity (4) provided with an access mouth (5), and at least one filter element or device (6) housed in the housing cavity (4), the apparatus (1) comprising a base (7) suitable to support the main body (3) and coupling means (8) suitable to position the main body (3) above the base (7), the coupling means (8) also including a main hinge (10) suitable to allow rotation and overturning of the main body (3) with respect to the base (7).

12 Claims, 4 Drawing Sheets

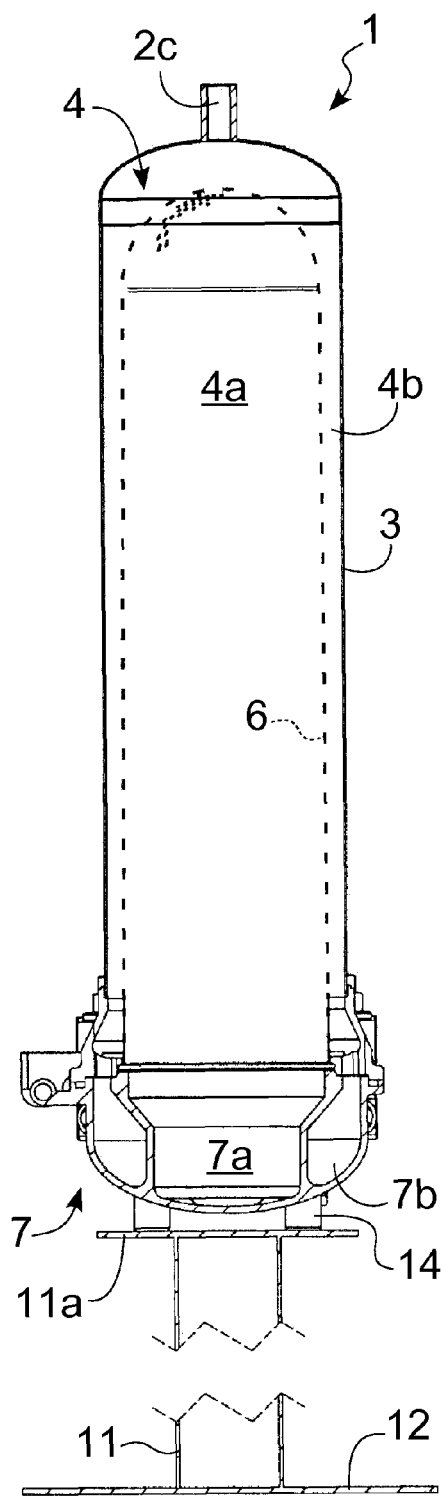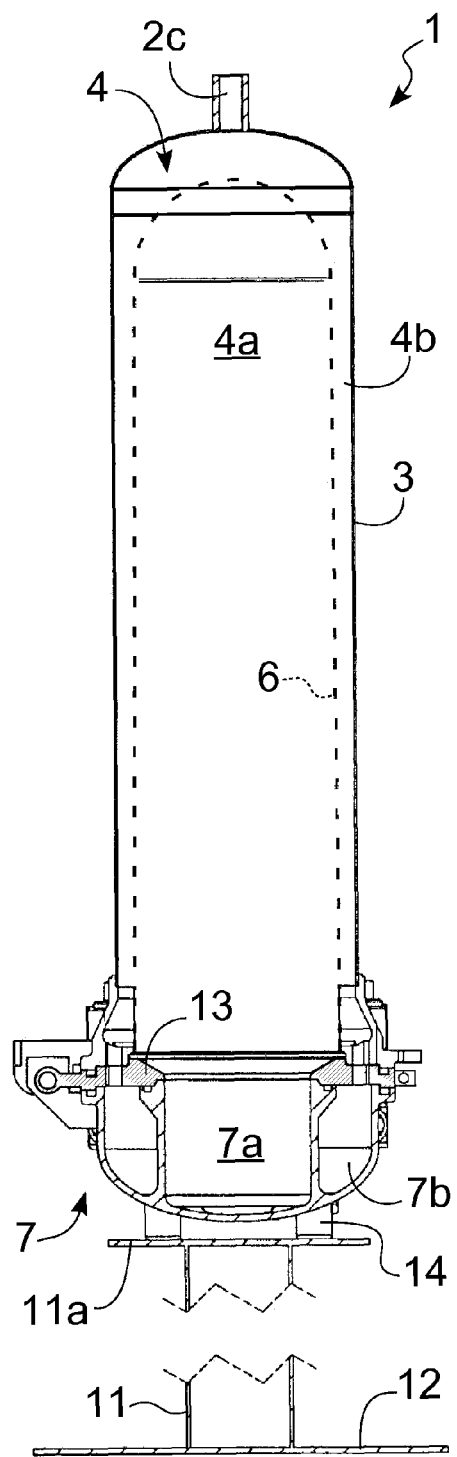
*Fig. 1a*  *Fig. 1b*

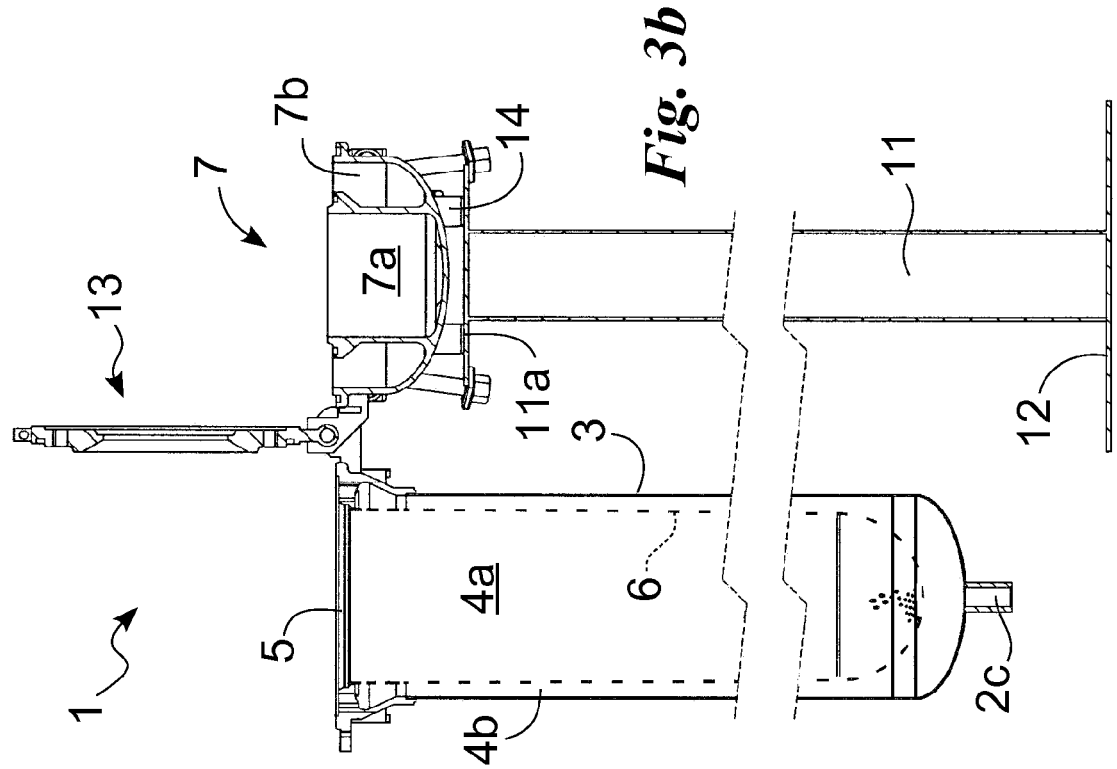
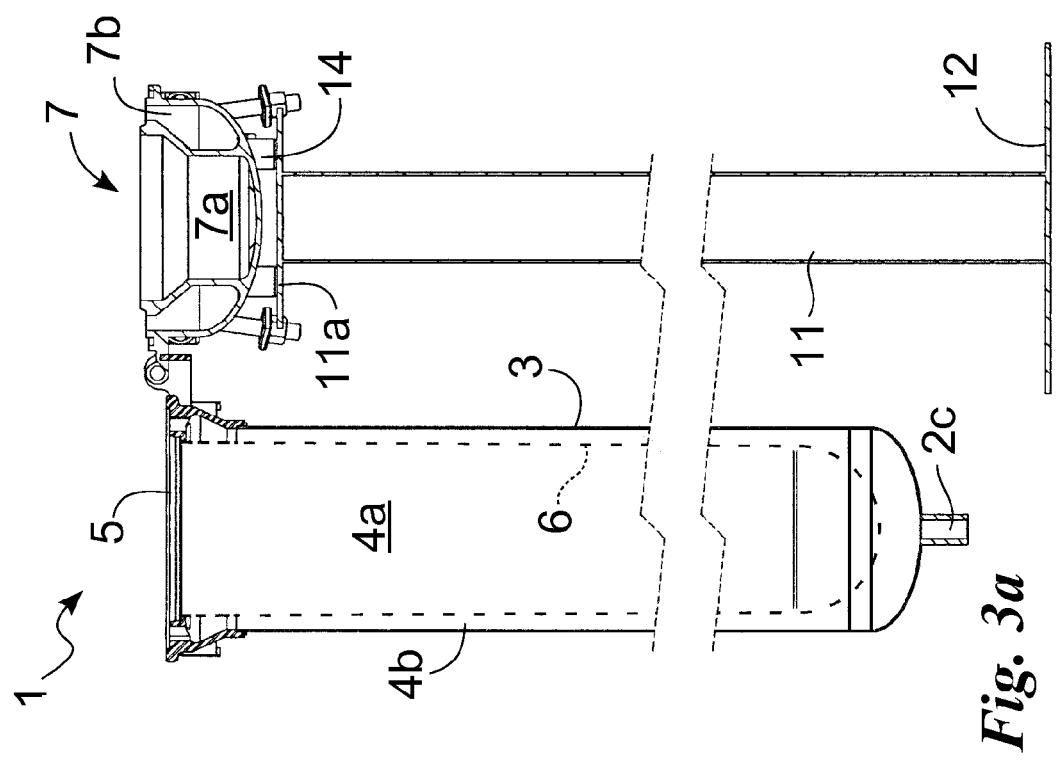

APPARATUS FOR FILTERING FLUIDS

FIELD OF THE INVENTION

The present invention relates to an apparatus for filtering fluids, such as an apparatus for industrial use for the purpose of filtering paints, chemical products, food products, lubricants, petrochemical products and the like of the type comprising: channelling means of a fluid, a main body connected to said channelling means and having an inner housing cavity and a mouth to access said housing cavity, and a filter element housed in said housing cavity and chosen from a bag filter and a basket filter.

DESCRIPTION OF THE PRIOR ART

As it is known, in the industrial field, one step in the process for producing fluid products, i.e. liquids, semi-liquids, suspensions, solutions, mixtures and the like of various densities, can be the filtration thereof.

Various types of filtration apparatus are known for this purpose, for example, for producing paints and dyes in general. These apparatus use filter elements of relatively large dimensions, housed in specific cylindrical housings.

The fluids are conveyed by channelling means which are inserted in the apparatus in positions arranged above the filter elements and which exit from positions arranged below these elements.

Moreover, these filter elements are of the basket type, substantially rigid, bag type, made of soft and typically textile material, or cartridge type, for example semi-rigid and made of cellulose and/or synthetic material.

In particular, apparatus including bag type filter elements are widely used and important, as they have the advantage of being particularly low cost and of being capable of filtering large volumes.

Bag type filter elements, just as basket type filter elements, have the further advantage of absorbing and retaining small quantities of material therein.

They are therefore also suitable for filtering costly and/or toxic fluids, such as pharmaceutical products, paints, enamels, resins, etc.

On the contrary, cartridge type filter elements are costly and have a much lower filtering capacity in terms of quantity.

They are practically used only when very fine filtering is required, capable of retaining particles with dimensions even below one micron. However, they also retain considerably quantities of fluids during the filtering step, which cannot in fact be recovered during operations to perform maintenance and replace the filters.

An example of filter apparatus can be found in the international patent application WO 89/07483, which shows an industrial filter unit for paints in which the filter element is supported by a cylindrical housing with vertical axis held by a tripod.

The filter element is inserted from above into the upper mouth of said cylindrical housing.

The U.S. Pat. No. 5,186,828 illustrates a bag type filter element for paints or the like which can be inserted and removably blocked in the upper mouth of a housing substantially having the shape of a barrel or of a drum.

Various industries produce and show in their catalogues bag type filter elements suitable for special liquids and inserted in specific cylindrical housings, through the upper mouth thereof. The housings have an independent tripod or column support.

The aforesaid prior art has some important drawbacks.

In fact, it must be considered that in these apparatus of industrial type, the filter element must be cleaned or replaced with a certain frequency, to maintain the efficiency thereof and in all cases of clogging, and that to perform this operation the element must be removed and detached from the relative housing in which it is contained.

Extraction of the filter element—which is immersed in the liquid to be filtered and which at least partly is always subject to phenomena of clogging—determines leakage into the environment and loss of part of the fluid treated, and leakage into the environment of part of the waste accumulated in the filter device.

In particular, leakage occurs when the filter element is completely lifted in relation to the housing that supports and contains it and then moved to perform maintenance or for replacement.

It is noted that current design techniques do not allow emptying of the inside of the filter bag or of those cavities of the filter containing the fluid to be filtered.

The large dimensions of the filter element in said apparatus of industrial type also means it must be lifted greatly in relation to the mouth for insertion and extraction, and therefore with manoeuvres that are difficult to perform.

In practice, maintenance proves to be difficult and a potential source of pollution of the surrounding areas.

Maintenance then becomes dangerous for personnel when the fluids filtered are of toxic nature.

In practice, personnel must use considerable force to greatly lift a filter bag containing a large quantity of fluid, which inevitably spills, spraying and contaminating the personnel and polluting the surrounding environment.

It must also be noted that if the fluids treated are very costly, leakage of a part thereof also determines economic damage.

Situations that are even more complex, and which can potentially create considerably problems for personnel, occur when the cylindrical housing of the filter is substantially in suspended position, i.e. supported by the body that encloses it at the top. In these cases, when the housing is opened to access the filter this determines potential detaching and dropping thereof. These filters are therefore generally of smaller dimensions and less used in industrial systems.

SUMMARY OF THE INVENTION

In this situation the technical aim of the present invention is to devise an apparatus for filtering fluids, preferably provided with a bag type filter element, capable of substantially overcoming the aforesaid drawbacks.

Within said technical aim, it is an important object of the invention to devise an apparatus suitable to prevent leakages of fluids treated, and of the relative waste, during maintenance or replacement of the filter element, through the possibility of emptying the filter completely and in advance.

Another important object of the invention is to devise an apparatus which allows operators to handle the filter element with minimum force and without the risk of contamination, as its content has been emptied in advance.

Yet another object is to devise an apparatus which is capable of sealed engagement with and disengagement, a simple and rapid manner the filter element from the relative housing.

The technical aim and the objects specified are achieved by an apparatus for filtering for filtering fluids of the type comprising: channelling means of a fluid, a main body connected to said channelling means and having an inner housing cavity and a mouth to access said housing cavity, and a filter element housed in said housing cavity and chosen from a bag filter and a basket filter, a base suitable to support said main body in a raised position, and coupling means suitable to engage said base with said main body so as to define an operating position of said apparatus in which said main body is above said base and said mouth is facing said base and below said housing cavity.

BRIEF DESCRIPTION OF THE DRAWINGS

Preferred embodiments of the invention are shown by way of example in the accompanying drawings. In particular:

FIGS. 1a and 1b show two similar embodiments of the apparatus, shown in elevation and in section, in the operating position;

FIGS. 3a and 3b shows sectional views of the embodiments respectively of FIGS. 1a and 1b in opening positions.

DESCRIPTION OF A PREFERRED EMBODIMENTS

Figure 2A:
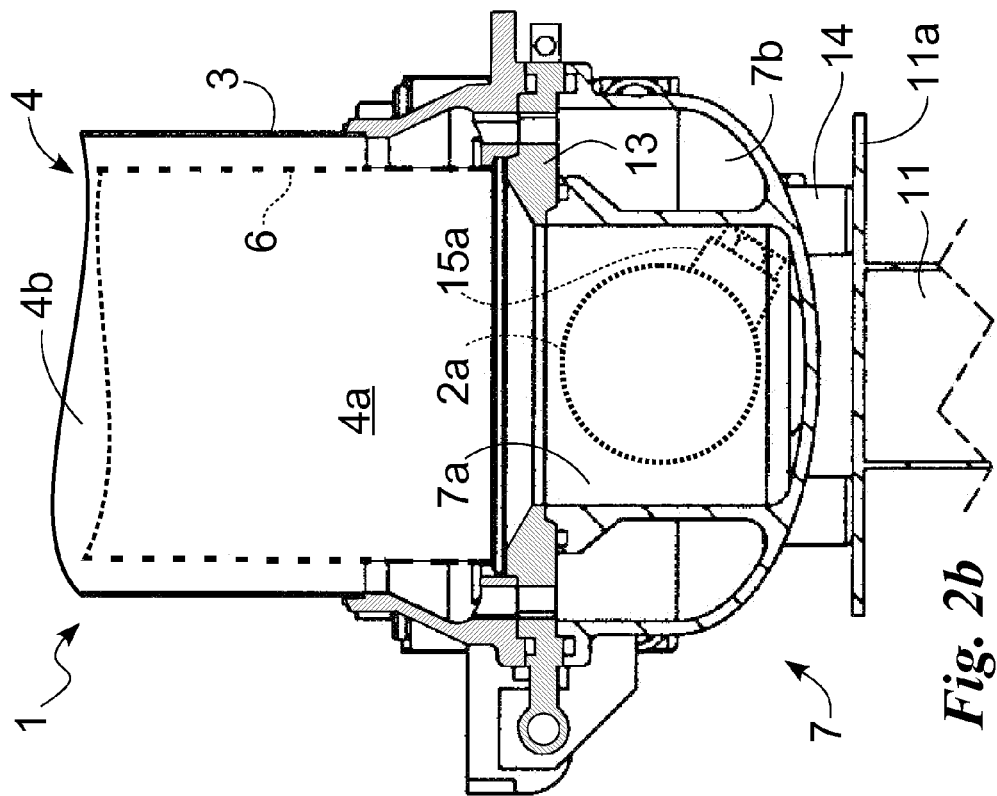
FIGS. 2a and 2b show—on an enlarged scale—details respectively of the preceding FIGS. 1a and 1b.
Figure 2B:
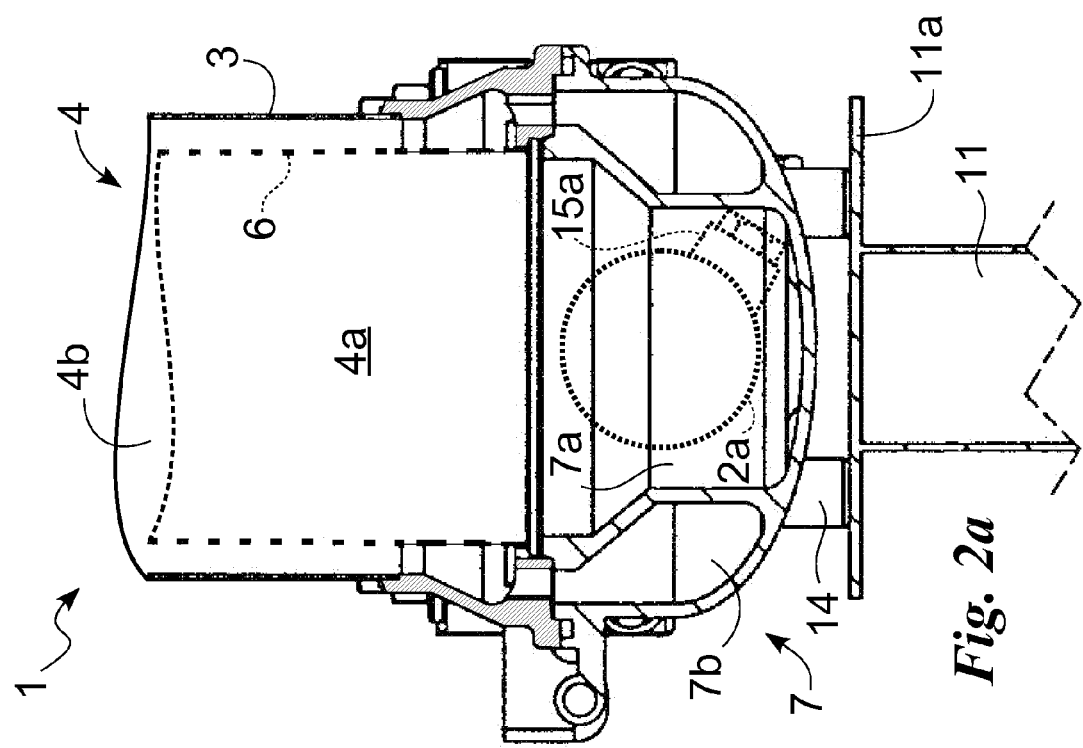

With reference to the figures, there is provided an apparatus for filtering fluids indicated as a whole with the number 1.

The apparatus 1 includes channelling means 2 of a fluid and a main body 3 connected to the channelling means 2.

The main body 3 is provided with an inner housing cavity 4 and with a mouth 5 to access the housing cavity 4.

At least one filter element or device 6 is inserted in the housing cavity 4 with access through the mouth 5.

This filter element or device 6 is preferably of the type with filter bag, but can also be, for example, of the basket type, or include combinations thereof.

Several filter elements mutually in series or in parallel, variously shaped, can also be provided.

According to the invention, said apparatus 1 has a special structure.

In fact, it has a base 7 suitable to support the main body 3, and coupling means 8 suitable to position the main body 3 above the base 7, with the mouth 5 placed under the housing cavity 4.

In particular, the coupling means 8 comprise screw connection elements 9 and a main hinge 10 suitable to overturn the main body 3 with respect to the base 7, when said screw connection elements 9 are disengaged.

The main hinge 10 defines in particular a rotation pin 10a substantially horizontal and transverse to the main direction of extension of the main body 3.

As shown in the figures, the main hinge 10 is suitable to allow overturning of the main body 3 from an operating position in which the housing cavity 4 extends above the mouth 5, to an overturned maintenance position in which the housing cavity 4 extends below the mouth 5.

The base 7 is engaged through support members 11 with a bearing surface 12.

The support members 11 can, for example, be a column or a tripod or the like and extend in height in a manner suitable to maintain the main body 3 raised with respect to the bearing surface 12 when it is in said maintenance position.

The figures show an expansion 11a placed on the top of the column support members 11 and the base 7 is in contact with the expansion 11a through supporting feet 14.

Advantageously, a shaped plate 13 is provided between the base 7 and the main body 3, removably engageable with the main body 3 and suitable to block the filter device 6 in the housing cavity 4.

The shaped plate 13 is blockable 6 through the coupling means 8.

Advantageously, the shaped plate 13 is hinged to the main body 3.

Moreover, hinging is provided at the main hinge 10, therefore at said rotation pin 10a.

The shaped plate 13 should be considered as optional as it is not necessary when the filter bags and/or baskets are provided with a special separate seal ring, such as "Polyloc" rings (manufactured by Filter Specialists Inc., Michigan City, U.S.A.) and/or conceptually similar rings.

The base 7 is substantially tank shaped and the main body 3 is engageable in the fashion of a cover on the base 7, in the operating position.

The channelling means 2 comprise at least one inflow duct 2a and at least one outflow duct 2b engaged with the base 7.

A vent 2c is produced in the main body 3, spaced from the mouth 5.

In particular, the inflow and outflow ducts 2a, 2b are substantially at the same level and lead to specific channels, substantially aligned, while the vent 2c is placed on the top of the apparatus 1 when the main body 3 is in the operating position, and below this when it is overturned in said maintenance position.

Figure 4A:
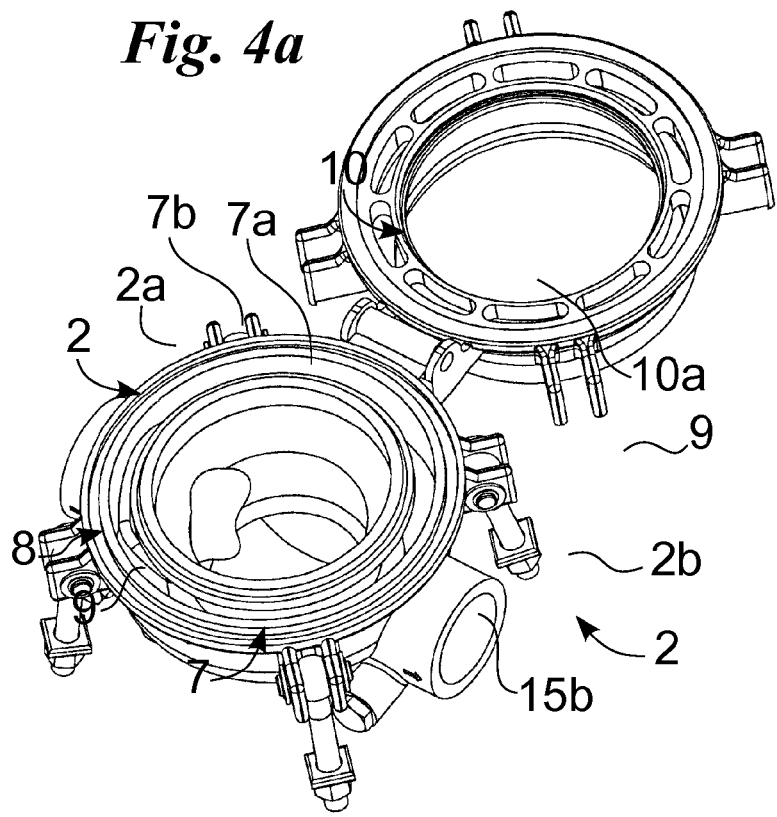
FIGS. 4a and 4b perspectively show elements respectively of FIGS. 3a and 3b.
Figure 4B:
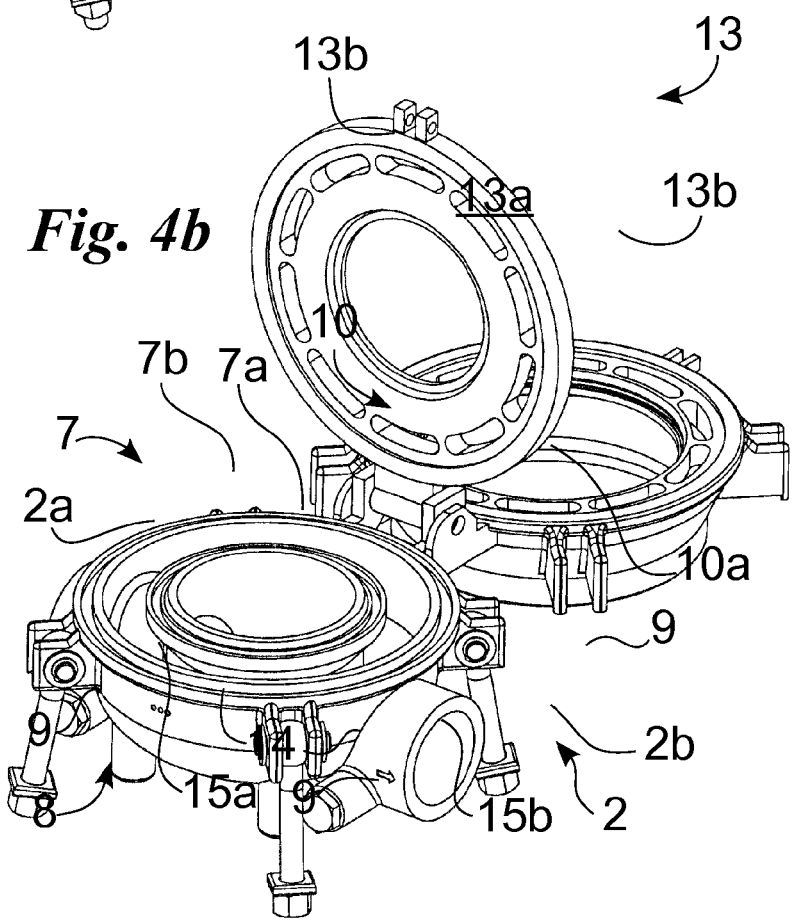

The inflow and outflow ducts 2a, 2b are then respectively connected to a first and to a second discharge duct 15a, 15b, shown in FIGS. 4a and 4b.

The discharge ducts 15a, 15b are sealed closed by sealed clamping members during operation of the apparatus 1, and are open during operations to perform maintenance or replace the filter element 6.

Said ducts are of determinative importance as they communicate with all areas of the apparatus and allow complete emptying thereof. In particular, they allow emptying of the inside of the filter bag and/or of the basket.

It is then noted that the housing cavity 4 has a central chamber 4a inside the filter device 6 and an annular chamber 4b included between the main body 3 and the filter device 6.

Analogously, the base 7 has a central seat 7a supplied by the inflow duct 2a and in communication with the central chamber 4a, and an annular seat 7b surrounding the central seat 7a and in communication with the outflow duct 2b and with the annular chamber 4b.

Naturally, it is possible to place the inflow duct in communication with the annular seat and the outflow duct in communication with the central seat.

Moreover, the shaped plate 13 includes a first central opening 13a alignable with the central chamber 4a, and a second annular opening 13b, alignable with the annular chamber 4b.

Moreover, the second opening is preferably divided into sectors.

Operation of the system 1, described above in the structural sense, is as follows.

Actual filtering is performed continuously: the channelling means 2 feed the fluid being processed through the filter element 6. In particular, the inflow duct 2a feeds the fluid into the base 7, at the central seat 7a thereof. From here it rises into the central chamber 4a of the housing cavity 4, through the filter element 6, and is fed into the adjacent annular chamber 4b.

From the annular chamber 4b the fluid descends once again into the base 7, at the annular seat 7b, to then be conveyed into the outflow duct 2b.

While passing through the filter element 6 the fluid is purified and the residues remain in the housing cavity 4, in proximity of the filter element 6.

When residues accumulate, filtration becomes less efficient and must therefore be interrupted in order to perform maintenance and cleaning operations, by removing the filtered part and/or by cleaning and/or replacing the filter element, depending on the situation.

As stated, the maintenance and cleaning step is delicate and important as, if performed with prior art methods, it could cause environmental pollution, dangers for the operators in the case of toxic fluids, and also detrimental losses of products when these are costly.

In particular, operators must avoid using considerable force and being sprayed and contaminated by products being processed.

Moreover, interruptions for maintenance and cleaning the apparatus 1 must be as brief as possible, to avoid having a considerable impact on production levels and in general to cut high costs required for skilled personnel.

The raised position of the main body 2 and of the filter device 6 and the presence in positions below the first and the second discharge duct 15a, 15b, openable upon command, allow emptying both of the central seat 7a and central chamber 4a, and of the annular seat 4b and annular chamber 4b. Naturally, emptying is performed by making the materials flow into specific containers.

Extraction of the filter device—emptied—is made even easier by the possibility of overturning the main body 2, so as to obtain an easily accessible mouth, in lowered position.

It is also noted that the presence of the shaped plate 13 is greatly advantageous, as it allows the filter element 6 to be easily engaged with and disengaged from the main body 2.

The invention achieves important advantages.

In fact, it allows the material contained to be emptied completely and makes extraction of the filter element simple, easy and immediate. Losses of material accumulated and of the filtered fluid are reduced to a minimum and maintenance operations are made clean and non-polluting, both in relation to the environment and in relation to operators.

The inflow 2a and outflow 2b ducts can be mutually in line, consequently facilitating insertion of the apparatus 1 in an industrial plant.

The invention is susceptible to modifications and variants falling within the inventive concept. All the details can be replaced by equivalent elements and the materials, the shapes and dimensions can be any.

The invention claimed is:

1. An apparatus (1) for filtering fluids of the type comprising: channeling means (2) of a fluid, a main body (3) connected to said channelling means (2) and having an inner housing cavity (4) and a mouth (5) to access said housing cavity (4), and a filter element (6) housed in said housing cavity (4) and chosen from a bag filter and a basket filter, a base (7) suitable to support said main body (3) in a raised position, and coupling means (8) suitable to engage said base (7) with said main body (3) so as to define an operating position of said apparatus (1) in which said main body (3) is above said base (7) and said mouth (5) is facing said base (7) and below said housing cavity (4), and said coupling means (8) comprise a main hinge (10) suitable to allow overturning of said main body (3) with respect to said base (7), to place it in a maintenance position in which said mouth (5) is above said housing cavity (4).

2. The apparatus according to claim 1, wherein said base (7) is provided with at least one discharge duct in communication with said housing cavity (4) and suitable to empty upon command at least said filter element (6).

3. The apparatus according to claim 1, wherein said channelling means (2) comprise an inflow duct (2a) and an outflow duct (2b) engaged with said base (7), and wherein said inflow duct (2a) and outflow duct (2b) are respectively provided with a first and with a second discharge duct (15a, 15b), sealed clamping members openable on command being provided for said discharge ducts (15a, 6 15b).

4. The apparatus according to claim 1, wherein said base (7) is engaged through support members (11) with a bearing surface (12), and wherein said support members (11) extend in height in a manner suitable to maintain said main body (3) raised with respect to said bearing surface (12) when it is in said maintenance position.

5. The apparatus according to claim 1, wherein a shaped plate (13) is provided between said base (7) and said main body (3), removably engageable with said main body (3) and suitable to bind said filter element (6) in said housing cavity (4).

6. The apparatus according to claim 5, wherein said shaped plate (13) is engageable on said filter element (6) through said coupling means (8).

7. The apparatus according to claim 5, wherein said shaped plate (13) is hinged to said main body (3).

8. The apparatus according to claim 5, wherein said shaped plate (13) is hinged at said main hinge (10).

9. The apparatus according to claim 1, wherein said housing cavity (4) has an annular chamber (4i b) included between said main body (3) and said filter element (6), and a central chamber (4a) inside said filter element (6), and wherein said base (7) has a central seat (7a) in communication with said central chamber (4a), and an annular seat (7b) surrounding said central seat (7a) and in communication with said annular chamber (4b).

10. The apparatus according to claim 9, wherein said channelling means (2) comprise at least one inflow duct (2a) and at least one outflow duct (2b) engaged with said base (7) and substantially mutually aligned, and wherein said central seat (7a) and said annular seat (7b) are selectively and separately in communication with said inflow duct (2a) and with said outflow duct (2b).

11. The apparatus according to claim 9, wherein a shaped plate (13) is provided between said base (7) and said main body (3), removably engageable with said main body (3) and suitable to bind said filter element (6) in said housing cavity (4) and said shaped plate (13) comprises a central opening (13a) alignable with said central chamber (4a), and an annular opening (13b) alignable with said annular chamber (4b), and wherein said annular opening (13b) is divided into sectors.

12. An apparatus (1) for filtering fluids of the type comprising: channeling means (2) of a fluid, a main body (3) connected to said channelling means (2) and having an inner housing cavity (4) and a mouth (5) to access said housing cavity (4), and a filter element (6) housed in said housing cavity (4) and chosen from a bag filter and a basket filter, a base (7) suitable to support said main body (3) in a raised position, and coupling means (8) suitable to engage said base (7) with said main body (3) so as to define an operating position of said apparatus (1) in which said main body (3) is above said base (7) and said mouth (5) is facing said base (7) and below said housing cavity (4), wherein a shaped plate (13) is provided between said base (7) and said main body (3), removably engageable with said main body (3) and suitable to bind said filter element (6) in said housing cavity (4), wherein said housing cavity (4) has an annular chamber (4b) included between said main body (3) and said filter element (6), and a central chamber (4a) inside said filter element (6), and wherein said base (7) has a central seat (7a) in communication with said central chamber (4a), and an annular seat (7b) surrounding said central seat (7a) and in communication with said annular chamber (4b), and wherein said shaped plate (13) comprises a central opening (13a) alignable with said central chamber (4a), and an annular opening (13b) alignable with said annular chamber (4b), and wherein said annular opening (13b) is divided into sectors.

* * * * *